July 25, 1933.  H. E. STONEBRAKER  1,919,811
THERMOMETER CASE
Filed June 27, 1931
*Fig.1*  *Fig.2*  *Fig.3*
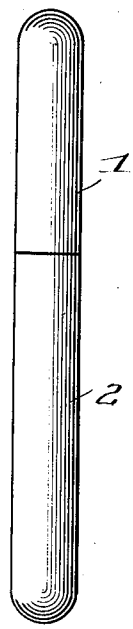
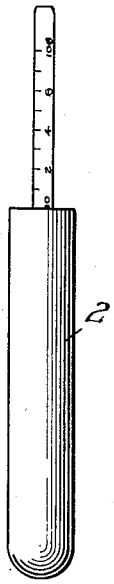
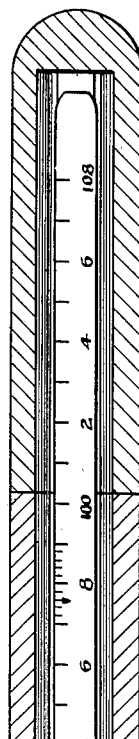
*Fig.5*  *Fig.4*
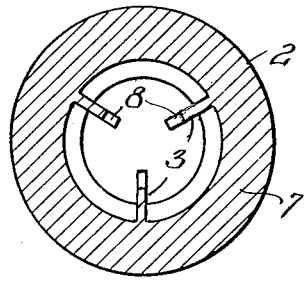
*Fig.6*
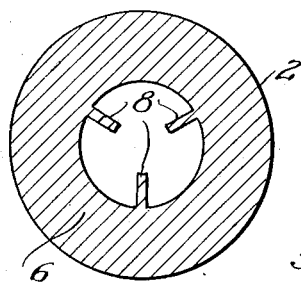
*Fig.7*
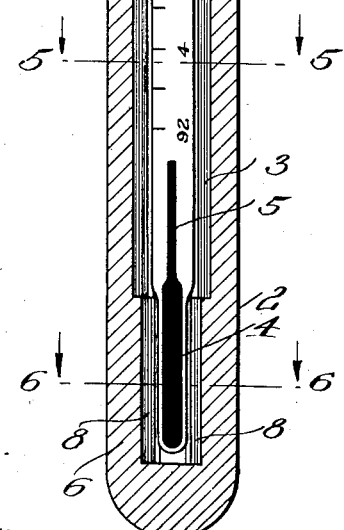
INVENTOR
Harold E. Stonebraker Patented July 25, 1933

1,919,811

UNITED STATES PATENT OFFICE

HAROLD E. STONEBRAKER, OF ROCHESTER, NEW YORK

THERMOMETER CASE

Application filed June 27, 1931. Serial No. 547,328.

This invention relates to improvements in thermometer cases, and particularly to cases for clinical and other thermometers of the same general type.

The invention is in the nature of an improvement on the thermometer case disclosed in Patent No. 1,786,271, granted December 23, 1930, and has for its object the provision of a thermometer case which is simple in construction, economical to make, and which affords maximum protection for delicate thermometers.

Another object of the invention is the production of a thermometer case constructed of soft resilient material which completely encloses the thermometer and supports it throughout its length in such a manner as to protect it against liability of breakage.

Still another object of the invention is the production of a thermometer case having resilient means for engaging and supporting the thermometer therein, such supporting means being extremely flexible to accommodate thermometers of different sizes or thickness, and which resiliently or yieldably support the thermometer out of contact with its inner walls for additionally protecting it against breakage.

A further object of the invention is the production of a thermometer case constructed of soft resilient material which is so formed as to permit easy insertion and withdrawal of different sized thermometers while still holding the thermometer with sufficient friction to prevent its accidental removal.

To these and other ends, the invention consists in the construction and arrangement of parts that will appear from the following description when read in conjunction with the accompanying drawing, the novel features being pointed out in the claims at the end of the specification.

In the drawing:

Fig. 1 is a front elevation of a thermometer case constructed according to one possible embodiment of the invention;

Fig. 2 is a similar view, the upper part or cap of the casing being removed to expose a thermometer arranged in the other part;

Fig. 3 is an enlarged vertical section of the case showing a thermometer arranged therein;

Fig. 4 is a similar view of the lower part of the case with the thermometer removed;

Fig. 5 is a transverse section through the thermometer case still further enlarged, and taken substantially on line 5—5 of Fig. 3, and looking in the direction of the arrows at said line;

Fig. 6 is a similar section taken substantially on line 6—6 of Fig. 3, looking in the direction of the arrows at said line, and Fig. 7 is a transverse section similar to Fig. 5 with a thermometer in position in the case.

The thermometer case illustrated herein is constructed in two parts 1 and 2, the part 1 comprising a cap and the part 2 a body portion. These parts are hollow, or have central openings or bores therein in which a thermometer may be received, and are of such a length that when the parts are arranged on the opposite ends of a thermometer, they engage or contact each other at their open ends and completely conceal or enclose the thermometer. Both parts are preferably constructed of resilient material, such as soft rubber, and the walls are somewhat thickened where they close the ends of the bores to afford greater protection at the ends where there is greatest liability of blows which might injure the thermometer. The combined length of the bore in the two parts may also be slightly greater than the length of the thermometer, so that the ends of the thermometer may be slightly spaced from the ends of the bore, thus affording additional protection thereto.

In order to amply protect the thermometer and to accommodate different thicknesses of thermometers, it is desirable to space it from the side walls of the bore so that accidental blows from the sides are cushioned and not transmitted directly to the thermometer. To this end, the sides of the bore are provided with three inwardly projecting ribs or fins 3 arranged substantially equidistantly from each other about the center. The fins or projections 3 extend longitudinally throughout the length of the bores and project radially inwardly from its side walls a distance sufficient to resiliently engage and support a small size thermometer between them. These fins or projections are constructed of the same soft resilient material as the outer walls of the casing, and are sufficiently thin to permit their being flexed laterally when a thermometer is inserted in the casing. The fins thus automatically adjust themselves to accommodate thermometers of different thicknesses.

By this arrangement, when a thermometer of larger diameter is inserted in the casing, one or more of the fins are flexed laterally toward the inner wall of the bore, one edge of each of the fins resiliently engaging the thermometer so that they lie between the thermometer and said inner wall. If the thermometer be of the largest size for which the case is intended, the fins which are extremely thin may be flexed into partial contact with the inner walls of the bore. The relative sizes of the bore and largest sized thermometer to be inserted therein is such that the space between the outer wall of the thermometer and the inner wall of the case is sufficient to receive the flexed fins without crowding or compressing them within such space. As is well known, clinical thermometers are of more or less triangular or sectorial cross-section and vary considerably in thickness. A case constructed as described is adapted to cooperate with the thermometer, irrespective of its sectional form, and support it suspended within the bore, as above described.

The lower end of the thermometer is provided with a mercury bulb 4 which communicates with a bore 5 extending upwardly therefrom. The bulb is joined to the body by a very thin wall and hence is quite susceptible to breaking. It is therefore desirable to afford maximum protection to this part of the instrument. The bulb is of considerably less diameter than the upper portion of the thermometer, and the side walls 6 of the lower part of the case 2 in which the bulb is seated are made thicker than the walls 7 of the upper part in which the body portion of the thermometer is arranged. By this arrangement, the lower portion of the bore or opening in the case is restricted or of lesser diameter than the upper portion, said portion being of a depth sufficient to receive the bulb of the thermometer, or of slightly greater depth to provide a small space between the end of the bulb and bore. This constricted portion constituting a bulb pocket is also provided with fins or projections 8 of soft resilient material such as that of which the casing itself is made. The projections 8 preferably correspond in number, character, and arrangement with the projections 3, and may be alined or made continuous therewith, as shown, but project inwardly to points nearer the center of the bore than the fins 3 to engage and yieldably support the bulb between them.

A thermometer case constructed as herein described provides not only complete protection for a delicate instrument, but greatest protection for the more delicate parts of the instrument. The provision of the fins or projections in the bore of the case not only serves to space the thermometer and its bulb from the side walls to protect it against direct blows on the side walls, but affords automatic means for adjustment to thermometers of different diameters. These projections also provide air passages to the bottom of the bore which permits the thermometer to be readily inserted in or removed from the casing, which can be done only with difficulty when the thermometer fits the bore of the casing closely.

A case such as herein described may be used as a lining for a bakelite or metal case, such as are in common use, without material change in the construction thereof or sacrificing any of its advantages. It will also be noted that a case as shown and constructed of soft, elastic or resilient material may be carried loosely in the pocket in which it will cling naturally by reason of such material of which it is constructed and its rather large diameter, thus eliminating the danger of loss without the use of special devices for securing it in the pocket or to the person.

Although only one embodiment of the invention is shown and described herein, it will be understood that this application is intended to cover such changes or modifications as come within the spirit of the invention or scope of the following claims.

I claim:

1. A thermometer case comprising two sections, each constructed of soft resilient material of substantial thickness to afford a supporting cushion for the thermometer throughout its length, each of said sections having a longitudinal bore substantially larger in diameter than the diameter of the thermometer, and resilient flexible longitudinally extending fins formed intergral with the body of the sections and projecting radially into the bore, said fins being of such width as to lightly engage a thermometer of minimum diameter and of such thinness as to bend readily when a thermometer of maximum diameter is inserted so that either a large or small diameter thermometer is held frictionally with such pressure as to permit its easy withdrawal.

2. A thermometer case comprising two sections, each constructed of soft resilient material of substantial thickness to afford a supporting cushion for the thermometer throughout its length, each of said sections having a longitudinal bore substantially larger in diameter than the diameter of the thermometer, and resilient flexible longitudinally extending fins formed integral with the body of the sections and projecting radially into the bore, said fins being of such width as to lightly engage a thermometer of minimum diameter and of such thinness as to bend readily when a thermometer of maximum diameter is inserted so that either a large or small diameter thermometer is held frictionally with such pressure as to permit its easy withdrawal, one of said sections having thickened walls throughout a portion of its length affording a restricted bulb-receiving bore, and resilient flexible longitudinally extending fins formed integral with the body around said restricted bore for engaging a bulb, said fins being of such width as to lightly engage a bulb of minimum diameter and of such thinness as to permit them to bend readily upon engagement with a bulb of maximum diameter.

HAROLD E. STONEBRAKER.